(12) United States Patent
Bruss

(10) Patent No.: US 6,382,712 B1
(45) Date of Patent: May 7, 2002

(54) WINDSHIELD DEFROSTING AIR DUCT FOR A WORK VEHICLE

(75) Inventor: Paul Thomas Bruss, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/884,332

(22) Filed: Jun. 19, 2001

(51) Int. Cl.[7] .................................................. B60S 1/54
(52) U.S. Cl. .................. 296/190.09; 296/208; 454/127; 454/121
(58) Field of Search .................. 296/190.09, 190.1, 296/208; 454/69, 152, 93, 115, 121, 123, 127, 196, 212, 198

(56) References Cited

U.S. PATENT DOCUMENTS

| | | | |
|---|---|---|---|
| 2,659,942 A | * 11/1953 | Iverson | 452/127 |
| 4,223,754 A | 9/1980 | Mizuno et al. | |
| 4,365,541 A | 12/1982 | Marques et al. | |
| 4,467,706 A | 8/1984 | Batcheller et al. | |
| 4,612,975 A | 9/1986 | Ikari | |
| 4,721,031 A | 1/1988 | Nakata et al. | |
| 4,874,036 A | 10/1989 | Masuda | |
| 5,308,279 A | 5/1994 | Grinberg | |
| 5,551,913 A | 9/1996 | Peifer | |
| 6,007,420 A | * 12/1999 | Harm et al. | 454/152 X |
| 6,071,591 A | 6/2000 | Dausch | |

* cited by examiner

Primary Examiner—Stephen T. Gordon
Assistant Examiner—Jason Morrow

(57) ABSTRACT

A single piece injection molded air distribution member carried by the steering wheel support structure forms three sides of an air duct with the fourth side of the air duct left open. The open side is positioned adjacent to the vehicle windshield where the windshield forms the fourth side of the air duct. Since the distribution member does not form an enclosed air duct, the distribution member can be made as a single piece injection molded component. The distribution member is placed in contact with the glass or slightly spaced from the glass. If spaced from the glass, a continuous layer of air flows from the distribution member over the surface of the glass. The distribution member has vanes that divide the duct into multiple air channels, each terminating in an air outlet.

14 Claims, 2 Drawing Sheets

WINDSHIELD DEFROSTING AIR DUCT FOR A WORK VEHICLE

FIELD OF THE INVENTION

The present invention relates to a windshield defrosting air duct for a work vehicle and in particular to an air duct formed by a single piece air distribution member positioned adjacent to the windshield that uses the windshield surface to define one side of the air duct.

BACKGROUND OF THE INVENTION

Work vehicles, such as an agricultural tractor, etc. typically provide operator cabs having a large front windshield to maximize visibility for the vehicle operator. To remove condensation from the interior surface of the windshield, a defroster system is provided that discharges air over the surface of the glass. The defroster system typically includes a plurality of air ducts formed in the housing covering the steering wheel support structure. The air ducts lead to discharge outlets that direct the air toward the glass surface. Typically these air ducts are formed of multiple molded plastic components joined together to form enclosed air ducts leading to the air outlets. The structure of these air ducts often requires a multiple piece construction or single piece molding techniques, such as rotational molding, that have large dimensional tolerances.

SUMMARY OF THE INVENTION

The present invention overcomes the difficulties of prior air duct assemblies by utilizing a single piece injection molded distribution member carried by the steering wheel support structure. The air distribution member forms three sides of an air duct with the fourth side of the air duct left open. The opened side is positioned adjacent to the vehicle windshield where the windshield forms the fourth side of the air duct. Since the distribution member itself does not form an enclosed air duct, a single piece injection molded component can be used as the air distribution member forming three sides of the duct.

The distribution member is placed in contact with the glass or it can be slightly spaced from the glass. If spaced from the glass, a continuous layer of air flows from the air distribution member over the surface of the glass The airflow is not restricted to flow solely from the air outlets. This ensures complete coverage of a glass surface, especially the glass surface closest to the steering wheel support structure, between the air outlets.

The air distribution member is formed with a plurality of vanes in the air duct that divide the duct into multiple air channels each terminating in an air outlet. The vanes include a center vane that begins near an air inlet into the air duct that divides the duct into two separate flow paths to insure that the air is evenly distributed laterally.

DESCRIPTION OF THE PREFERRED EMBODIMENT

Figure 1:
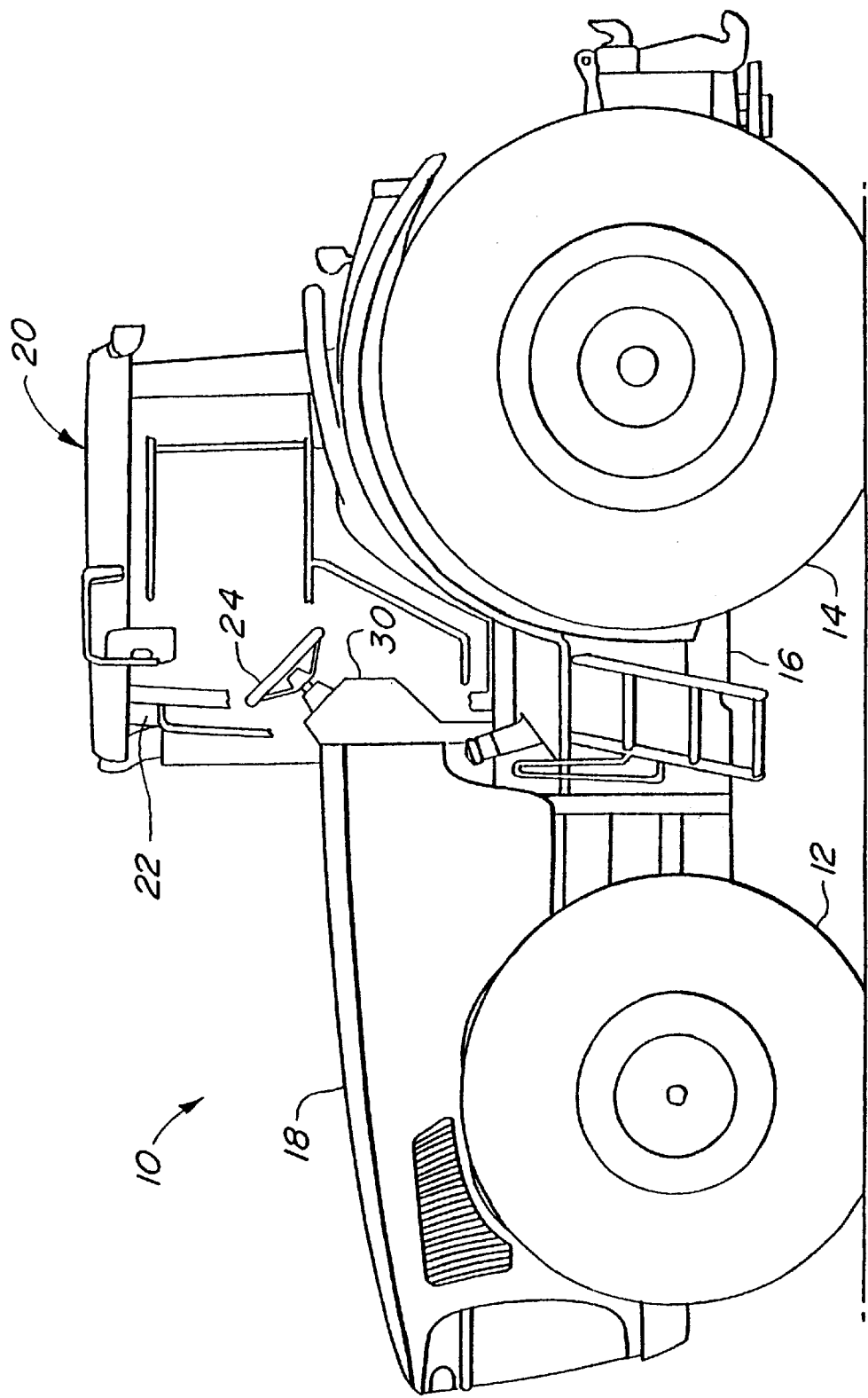
FIG. 1 is a side view of an agricultural tractor having the air distribution member of the present invention illustrated with a portion of the cab structure broken away for clarity.

An agricultural tractor 10 is shown in FIG. 1 and includes the air distribution member of the present invention. The tractor 10 includes front and rear wheels 12 and 14 supporting the tractor chassis 16. The tractor includes a front hood 18 that covers the engine and other components (not shown). A vehicle operator sits in an operator's cab 20 that includes a front windshield 22 and a steering wheel 24. The steering wheel 24 is carried by a steering wheel support structure 26 extending upward through the floor 28 of the operator's cab. Housing 30 covers the support structure 26 to provide an attractive interior appearance. A steering wheel 24 is mounted to the support structure 26. The housing 30 forms what appears to be a continuation of the hood 18 into the operator's cab. However, the front windshield 22 passes between the support structure 26 and the hood 18. This enables the windshield 22 to be made of a single piece of glass, or two pieces, an upper piece and a lower piece, with the entire lower edge 34 of the windshield sealed along the front of the cab floor 28. This eliminates the need for separate left and right glass panels each sealed around the support structure beneath the hood 18 and housing 30.

Figure 2:
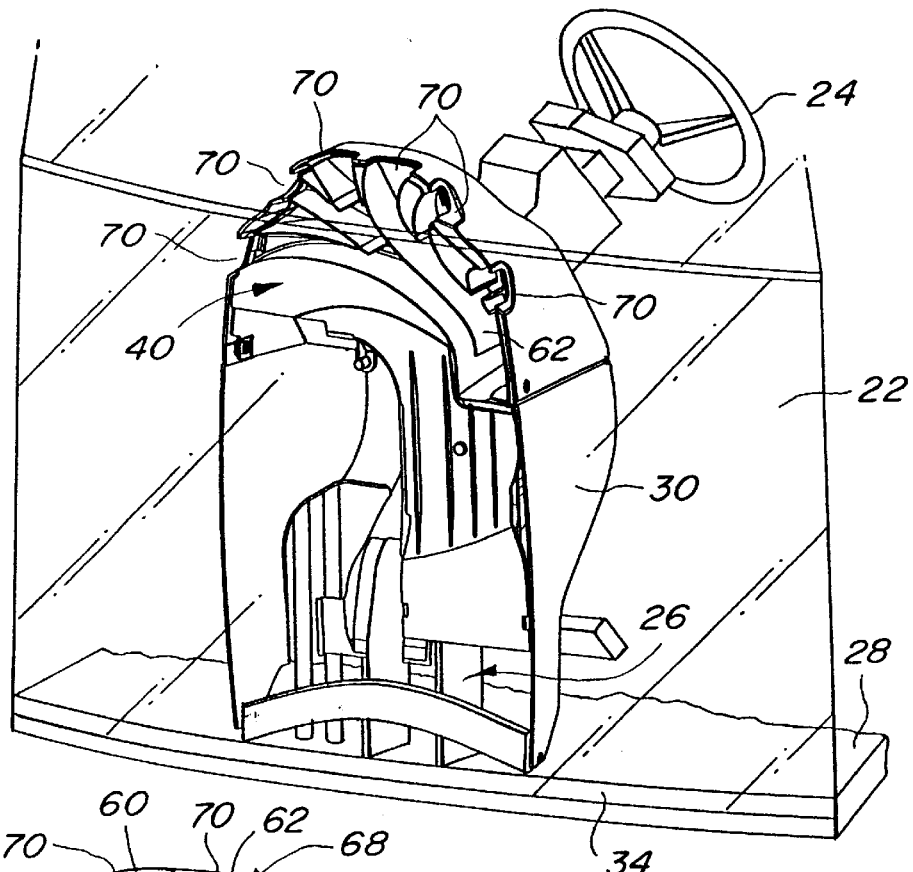
FIG. 2 is a perspective view of the steering wheel support structure and the windshield of the operator's cab.
Figure 3:
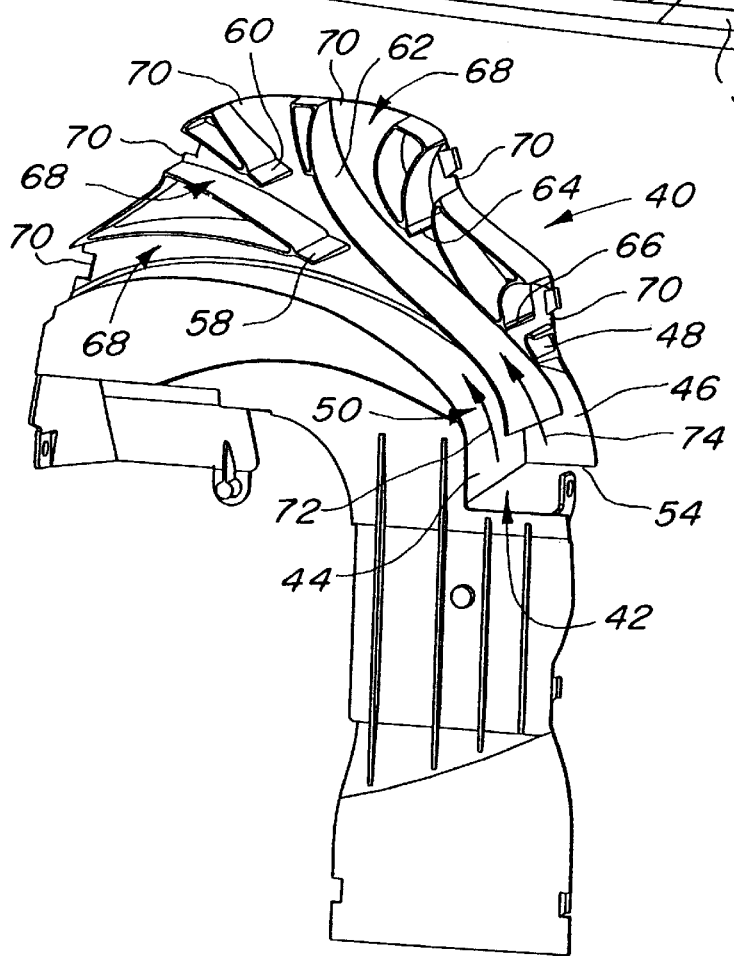
FIG. 3 is a perspective view of the air distribution member of the present invention.

The air distribution member 40 of the present invention is shown in FIGS. 2 and 3. The air distribution member 40 is attached to the support structure 26 and is placed adjacent to the interior surface of the windshield 22. The air distribution member 40 is a single piece injection molded plastic resin component. Member 40 forms three sides 44, 46, and 48 of an air duct 42. The air duct 42 is formed with three sides and has an open fourth side 50. The member 40 is placed adjacent to the windshield 22 with the open side 50 facing the windshield so that the windshield closes the fourth side of the air duct 42 to substantially enclose the air duct.

Air flows into the duct 42 through an inlet 54. Several vanes 58, 60, 62, 64 and 66 divide the air duct 42 into multiple air channels 68 leading to multiple air outlets 70. A center vane 62 begins at the inlet 54 and divides the duct 42 into two airflow paths 72 and 74. The center vane 62 begins at the air inlet 54 to divide the air flow in the duct into two air flow paths so that the both left and right lateral sides of the support structure are assured of receiving adequate air flow.

The member 40 can be placed directly in contact with the surface of the glass to form a seal between the member 40 and the windshield. Preferably, the member 40 is spaced from the windshield by as much as six to ten millimeters. By spacing the air distribution member 40 from the windshield surface, air is allowed to flow from a duct 42 over the entire window surface and not just through the outlets 70. This ensures that there are no "dead zones" near the steering wheel support structure between air outlets that do not receive any airflow. Better coverage of the windshield surface is obtained when the air distribution member is slightly spaced from the windshield surface.

The air distribution member of the present invention is less expensive and easier to manufacture than previous multi-piece air ducts and can be made with a tighter dimensional tolerance. In addition, improved defroster performance is also achieved.

Having described the preferred embodiment, it will become apparent that various modifications can be made without departing from the scope of the invention as defined in the accompanying claims.

What is claimed is:

1. A work vehicle having an operator's cab comprising:
   a front windshield;
   a support structure in the cab adjacent the front windshield;
   an air distribution member on the support structure forming three sides of an air duct open on a fourth side that is disposed adjacent the windshield wherein the windshield forms the fourth side of the air duct, the duct having an air inlet for receiving air into the air duct and the duct terminating at least one air outlet.

2. The work vehicle as defined by claim 1 wherein the air distribution member is spaced from the windshield whereby air is allowed to flow from between the air distribution member and the windshield.

3. The work vehicle as defined by claim 1 wherein the air distribution member includes vanes in the air duct dividing the duct into multiple air channels terminating at multiple air outlets.

4. The work vehicle as defined by claim 3 wherein a center vane begins closer to the air inlet than the other vanes to substantially divide the duct into two air flow paths before the air duct is divided into multiple air channels.

5. The work vehicle as defined by claim 4 wherein the center vane begins adjacent the air inlet.

6. The work vehicle as defined by claim 3 wherein the air distribution member is spaced from the windshield whereby air is allowed to flow from between the air distribution member and the windshield between the multiple air outlets.

7. The work vehicle as defined by claim 1 wherein the air distribution member is of a one piece construction.

8. The work vehicle as defined by claim 1 wherein the air distribution member is made of injection molded plastic resin.

9. An air distribution member for directing air over an interior surface of a vehicle windshield comprising walls defining an air duct having an inlet, vanes in the air duct to divide the air duct into multiple air channels terminating at air outlets, the walls of the member forming three sides of the air duct and being open on a fourth side, the member being adapted to be placed adjacent the vehicle windshield wherein the windshield forms the fourth side of the air duct.

10. The air distribution member as defined by claim 9 wherein the member is of a one piece construction.

11. The air distribution member as defined by claim 10 wherein the member is made of injection molded plastic resin.

12. The air distribution member as defined by claim 9 wherein the member is adapted to be spaced from the windshield whereby air is able to flow from both the air outlets and from between the air outlets.

13. The air distribution member as defined by claim 9 wherein a center vane begins closer to the air inlet than the other vanes to substantially divide the duct into two air flow paths prior to dividing the duct into multiple air channels.

14. The air distribution member as defined by claim 13 wherein a center vane begins adjacent the air inlet.

* * * * *